(12) United States Patent
Moldoveanu

(10) Patent No.: US 12,099,156 B2
(45) Date of Patent: Sep. 24, 2024

(54) COMBINING NOISE ATTENUATION AND WAVEFIELD RECONSTRUCTION IN SEISMIC PROCESSING

(71) Applicant: Schlumberger Technology Corporation, Sugar Land, TX (US)

(72) Inventor: Nicolae Moldoveanu, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 599 days.

(21) Appl. No.: 17/309,927

(22) PCT Filed: Jan. 7, 2020

(86) PCT No.: PCT/US2020/012498
§ 371 (c)(1),
(2) Date: Jun. 30, 2021

(87) PCT Pub. No.: WO2020/146322
PCT Pub. Date: Jul. 16, 2020

(65) Prior Publication Data
US 2022/0066061 A1   Mar. 3, 2022

Related U.S. Application Data

(60) Provisional application No. 62/789,582, filed on Jan. 8, 2019.

(51) Int. Cl.
*G01V 1/36* (2006.01)
*E21B 49/00* (2006.01)
(Continued)

(52) U.S. Cl.
CPC .............. *G01V 1/364* (2013.01); *E21B 49/00* (2013.01); *G01V 1/345* (2013.01); *G01V 1/3843* (2013.01);
(Continued)

(58) Field of Classification Search
CPC .................. G01V 1/364; G01V 1/345; G01V 2210/1293; G01V 2210/1423; G01V 2210/324; E21B 49/00; G06N 5/022
See application file for complete search history.

(56) References Cited

U.S. PATENT DOCUMENTS 5,265,192 A * 11/1993 McCormack .......... G01V 1/364
702/14
5,920,828 A   7/1999 Norris et al.
(Continued)

FOREIGN PATENT DOCUMENTS

AU   2013201072 A1 *  9/2013 ............... G01V 1/36
WO   WO-2006108971 A1 * 10/2006 ............... G01V 1/32
(Continued)

OTHER PUBLICATIONS

Yang Shen et al., "Seismic trace editing by applying machine learning" University of Science and Technology of Chine (USTC), pp. 2256-2260; SEG International Exposition and 88the Annual meeting. (Year: 2018).*
(Continued)

*Primary Examiner* — Michael J Dalbo
*Assistant Examiner* — Kaleria Knox
(74) *Attorney, Agent, or Firm* — Jeffrey D. Frantz

(57) ABSTRACT

A method for processing seismic data includes receiving seismic data comprising seismic traces collected from a land-based or marine seismic array, applying a noise mitigation process to the seismic data to generate a first stack volume, identifying, using a machine-learning algorithm,
(Continued)

one or more traces of the seismic traces as having a relatively high residual noise, after applying the noise mitigation process, in comparison to other traces of the seismic traces, mitigating noise in the one or more identified traces, and performing a wavefield reconstruction to generate a second stack volume after mitigating the noise in the one or more traces after mitigating the noise in the one or more identified traces, to interpolate a portion of the wavefield corresponding to where the one or more identified traces were located and mitigated.

20 Claims, 13 Drawing Sheets

(51) Int. Cl.
    *G01V 1/34*         (2006.01)
    *G01V 1/38*         (2006.01)
    *G06N 5/022*       (2023.01)

(52) U.S. Cl.
    CPC ..... *G06N 5/022* (2013.01); *G01V 2210/1293* (2013.01); *G01V 2210/1423* (2013.01); *G01V 2210/324* (2013.01)

(56) References Cited

U.S. PATENT DOCUMENTS

| | | | | |
|---|---|---|---|---|
| 6,021,379 | A * | 2/2000 | Duren | G01V 1/32 367/73 |
| 2014/0286128 | A1* | 9/2014 | Grimm | G01V 1/28 367/24 |
| 2015/0362608 | A1* | 12/2015 | van Groenestijn | G01V 1/36 702/14 |
| 2017/0031047 | A1* | 2/2017 | Cheng | G01V 1/364 |
| 2017/0176614 | A1* | 6/2017 | Alhukail | G01V 1/32 |
| 2017/0285196 | A1* | 10/2017 | Zhang | G01V 1/30 |
| 2017/0363757 | A1* | 12/2017 | Halliday | G01V 1/282 |
| 2018/0267188 | A1* | 9/2018 | Turquais | G01V 1/38 |

FOREIGN PATENT DOCUMENTS

| | | | | |
|---|---|---|---|---|
| WO | WO-2015120461 | A1 * | 8/2015 | G01V 1/36 |
| WO | WO-2015121755 | A2 * | 8/2015 | G01V 1/32 |

OTHER PUBLICATIONS

Mohammad Amir Nazari Siahsar et.al., "Simultaneous denoising and interpolation of 2D seismic data using data-driven non negative dictionary learning", pp. 309-321, journal homepage www.elsevier.com/locate/sigpo, Signal Processing (Year: 2017).*

International Preliminary Report on Patentability of International Patent Application No. PCT/US2020/012498 mailed on Jul. 22, 2021, 7 pages.

Nazari Siahsar, M.A et al., "Simultaneous denoising and interpolation of 2D seismic data using data-driven non-negative dictionary learning", Signal Processing, 2017, 141, pp. 309-321.

Extended Search Report issued in European Patent Application No. 203738167.4 dated Aug. 25, 2022, 9 pages.

Shen et al., "Seismic trace editing by applying machine learning", 2018 SEG International Exposition and 88th Annual Meeting, Society of Exploration Geophysicists, pp. 2256-2260, 2018.(5 pages)

International Search Report and Written Opinion of the equivalent PCT/US2020/012498 emailed on Apr. 1, 2020 (10 pages).

\* cited by examiner

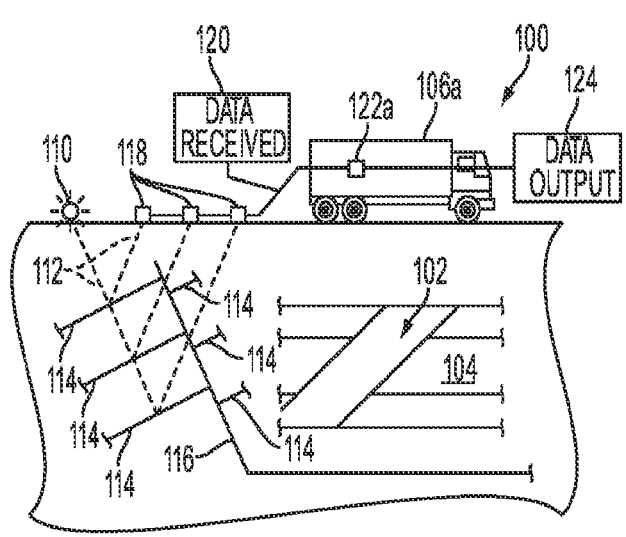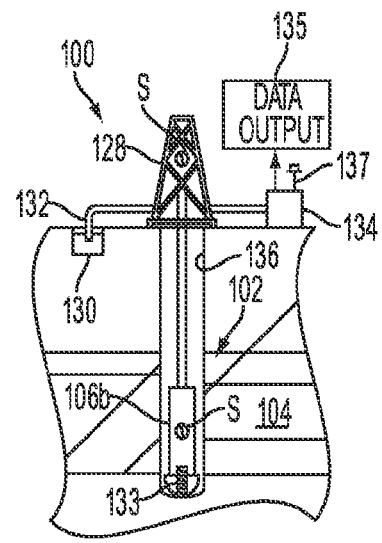
FIG. 1A        FIG. 1B
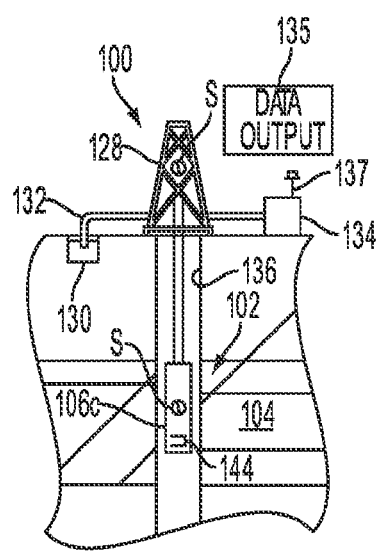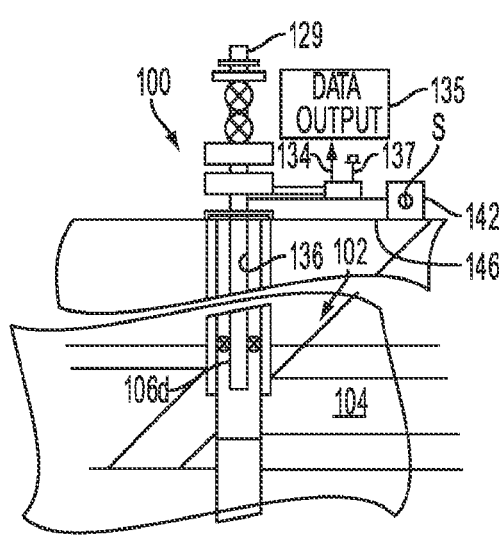
FIG. 1C        FIG. 1D

COMBINING NOISE ATTENUATION AND WAVEFIELD RECONSTRUCTION IN SEISMIC PROCESSING

CROSS-REFERENCE TO RELATED APPLICATIONS

This application is a National Stage Entry of International Patent Application No. PCT/US2020/012498, filed on Jan. 7, 2020, which claims priority to U.S. Provisional Patent Application No. 62/789,582, filed on Jan. 8, 2019 and is incorporated herein by reference in its entirety.

BACKGROUND

During acquisition of a seismic survey, diverse types of noise may affect seismic records entirely or may be apparent in a subset of the traces of the seismic records. For instance, for marine acquisition, the level of noise may be caused by swell and marine currents. As a seismic streamer can be 8 km to 12 km long, the swell-generated noise or current-generated noise might affect part of the streamer, i.e. a certain number of traces, while having no apparent effect on other parts. An example of such noise is shown in FIG. 6. For land seismic acquisition, the noise may generally be shot-associated (FIG. 7). Current methods used in processing of seismic data for noise attenuation are based on application of filters designed to remove the noise in a certain domain, or on modeling of the seismic noise and subtraction of the model noise from seismic data.

Seismic data is generally not acquired according to Nyquist sampling criteria and one step in data processing is to interpolate the seismic data to improve the sampling. This is generally done in the earlier stages of data processing. However, if noise is present in the data, the output from the interpolation may be contaminated by noise.

SUMMARY

A method for processing seismic data is disclosed. The method includes receiving seismic data comprising seismic traces collected from a land-based or marine seismic array, applying a noise mitigation process to the seismic data to generate a first stack volume, identifying, using a machine-learning algorithm, one or more traces of the seismic traces as having a relatively high residual noise, after applying the noise mitigation process, in comparison to other traces of the seismic traces, mitigating noise in the one or more identified traces, and performing a wavefield reconstruction to generate a second stack volume after mitigating the noise in the one or more traces after mitigating the noise in the one or more identified traces, to interpolate a portion of the wavefield corresponding to where the one or more identified traces were located and mitigated, and generating an image of a subterranean domain based on the seismic data after mitigating noise and performing the wavefield reconstruction.

A non-transitory, computer-readable medium storing instructions that, when executed by one or more processors of a computing system, cause the computing system to perform operations is disclosed. The operations include receiving seismic data comprising seismic traces collected from a land-based or marine seismic array, applying a noise mitigation process to the seismic data to generate a first stack volume, identifying, using a machine-learning algorithm, one or more traces of the seismic traces as having a relatively high residual noise, after applying the noise mitigation process, in comparison to other traces of the seismic traces, mitigating noise in the one or more identified traces, and performing a wavefield reconstruction to generate a second stack volume after mitigating the noise in the one or more traces after mitigating the noise in the one or more identified traces, to interpolate a portion of the wavefield corresponding to where the one or more identified traces were located and mitigated.

A computing system is disclosed. The system includes one or more processors, and a memory system including one or more non-transitory, computer-readable media storing instructions that, when executed by at least one of the one or more processors, cause the computing system to perform operations. The operations include receiving seismic data comprising seismic traces collected from a land-based or marine seismic array, applying a noise mitigation process to the seismic data to generate a first stack volume, identifying, using a machine-learning algorithm, one or more traces of the seismic traces as having a relatively high residual noise, after applying the noise mitigation process, in comparison to other traces of the seismic traces, mitigating noise in the one or more identified traces, and performing a wavefield reconstruction to generate a second stack volume after mitigating the noise in the one or more traces after mitigating the noise in the one or more identified traces, to interpolate a portion of the wavefield corresponding to where the one or more identified traces were located and mitigated, and generating an image of a subterranean domain based on the seismic data after mitigating noise and performing the wavefield reconstruction.

Thus, the computing systems and methods disclosed herein are more effective methods for processing collected data that may, for example, correspond to a surface and a subsurface region. These computing systems and methods increase data processing effectiveness, efficiency, and accuracy. Such methods and computing systems may complement or replace conventional methods for processing collected data.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIGS. 1A, 1B, 1C, 1D, 2, 3A, and 3B illustrate simplified, schematic views of an oilfield and its operation, according to an embodiment.

DESCRIPTION OF EMBODIMENTS

Figure 2:
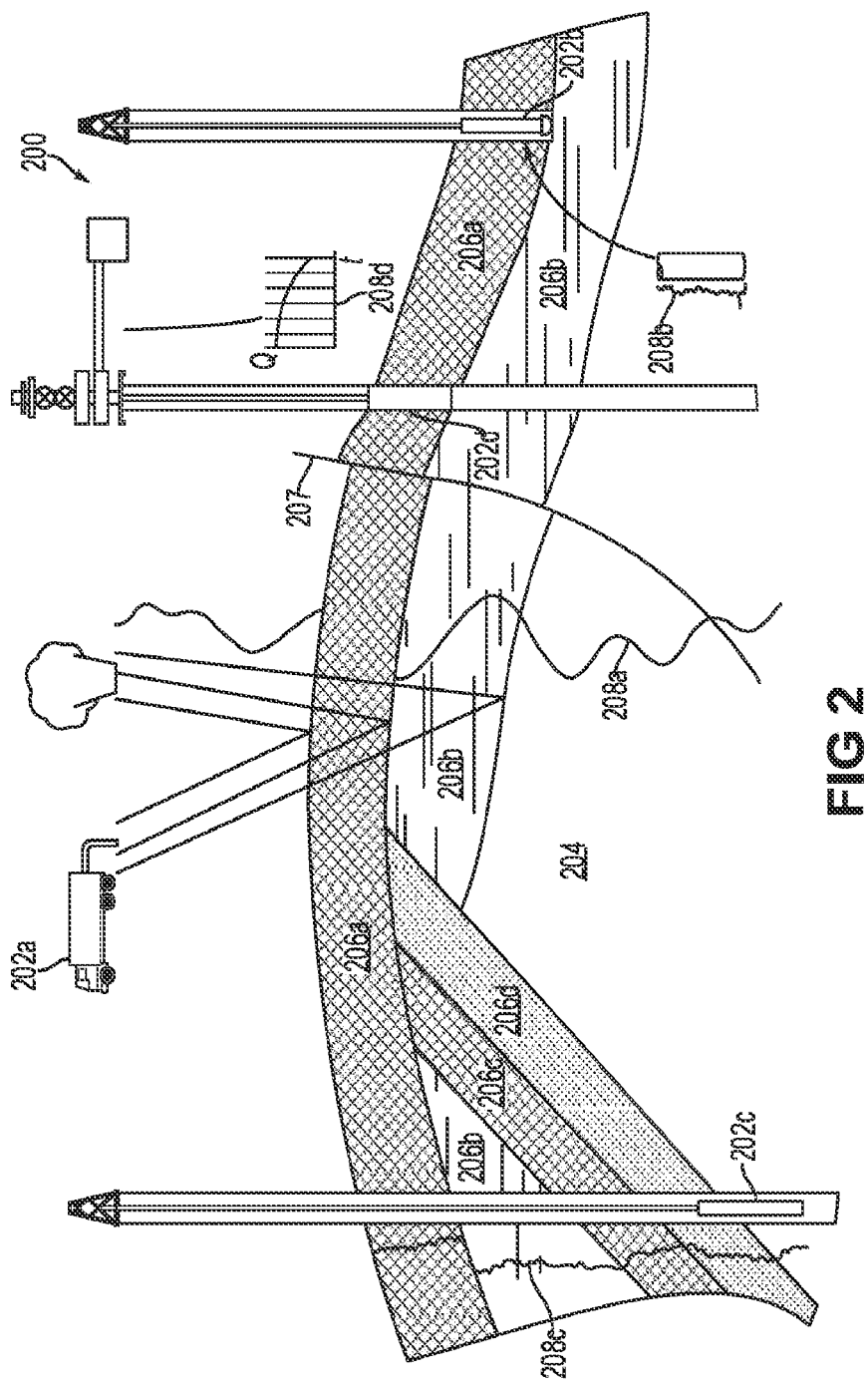

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3A:
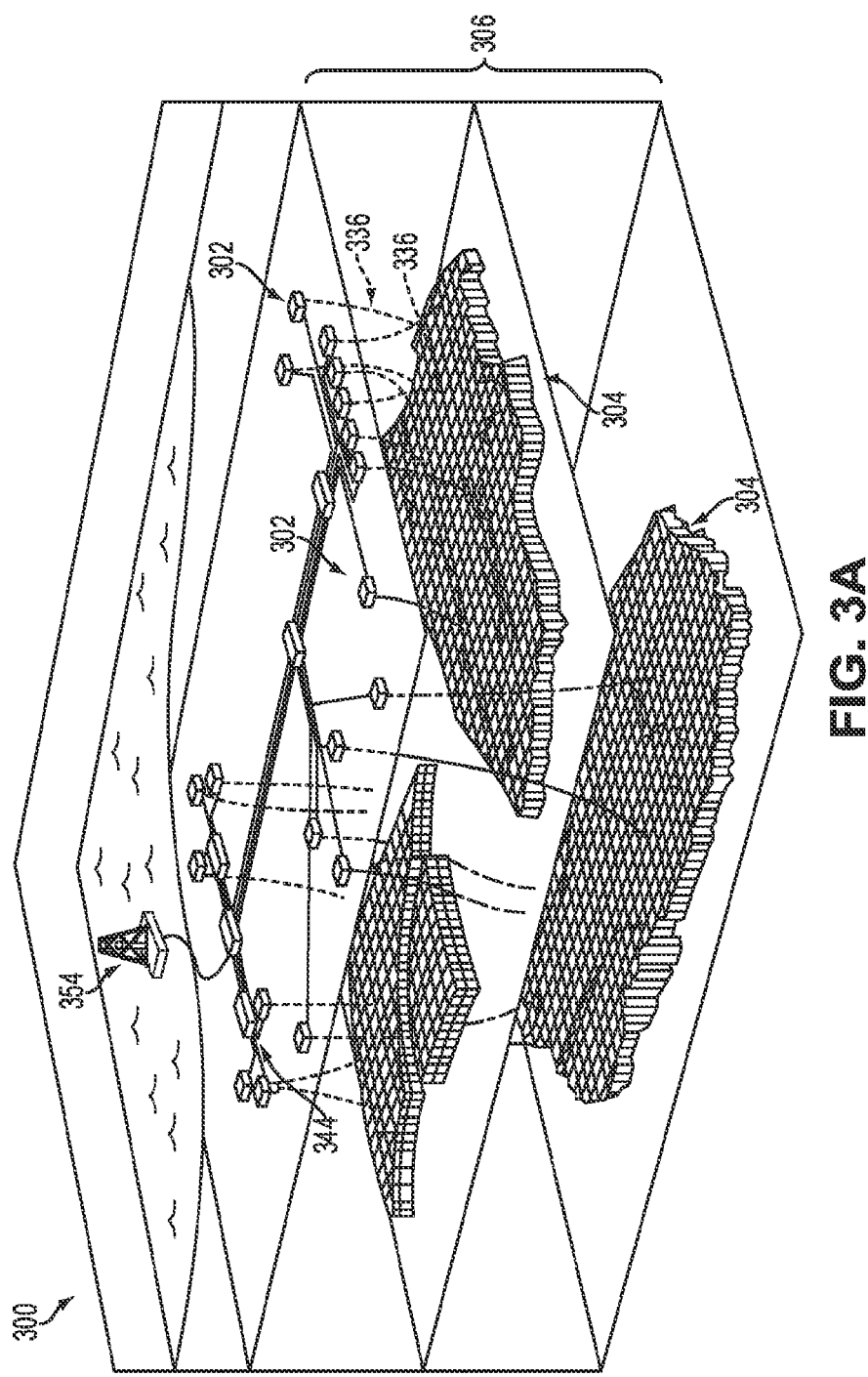

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
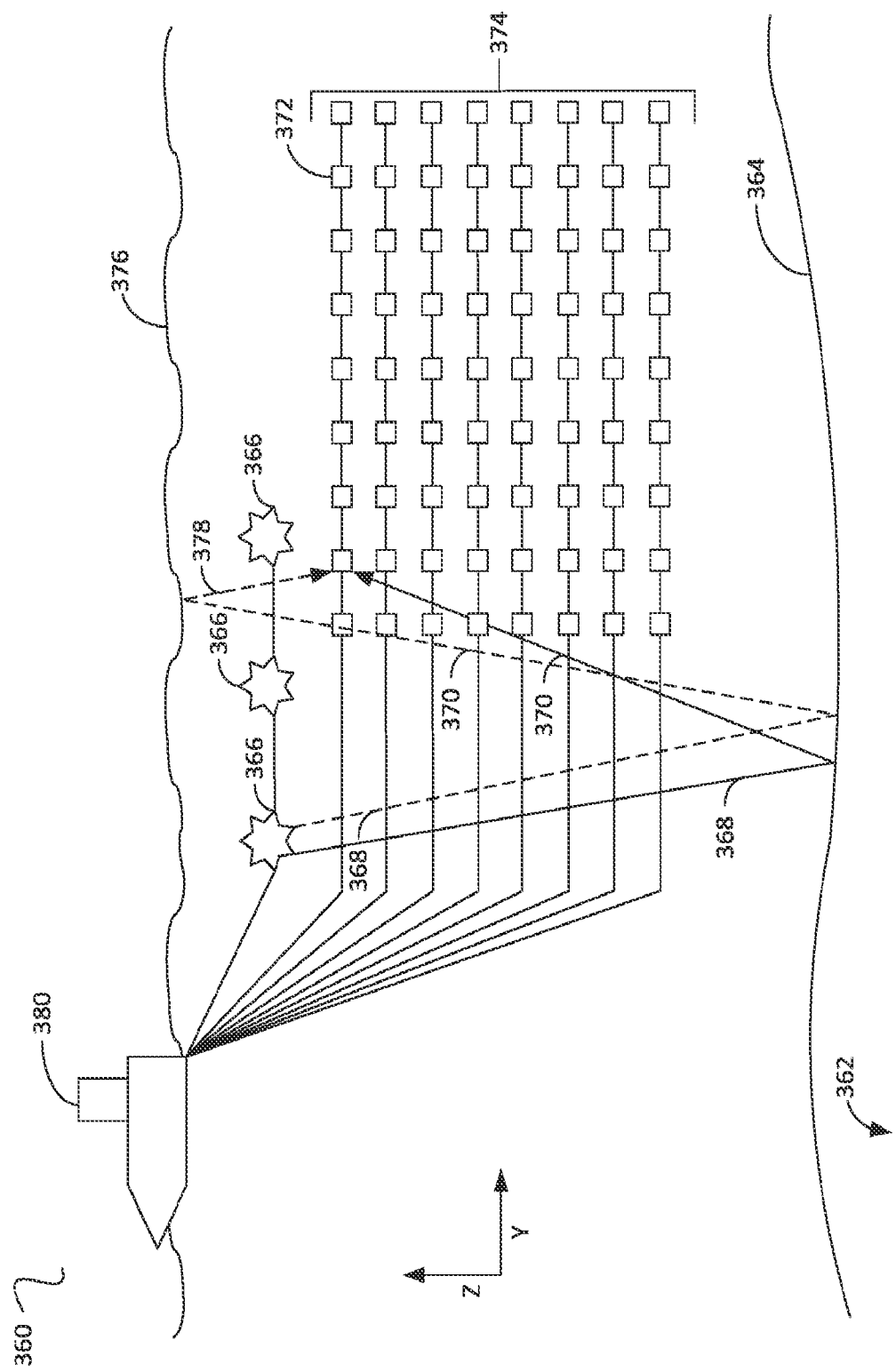

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362. Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Figure 4:
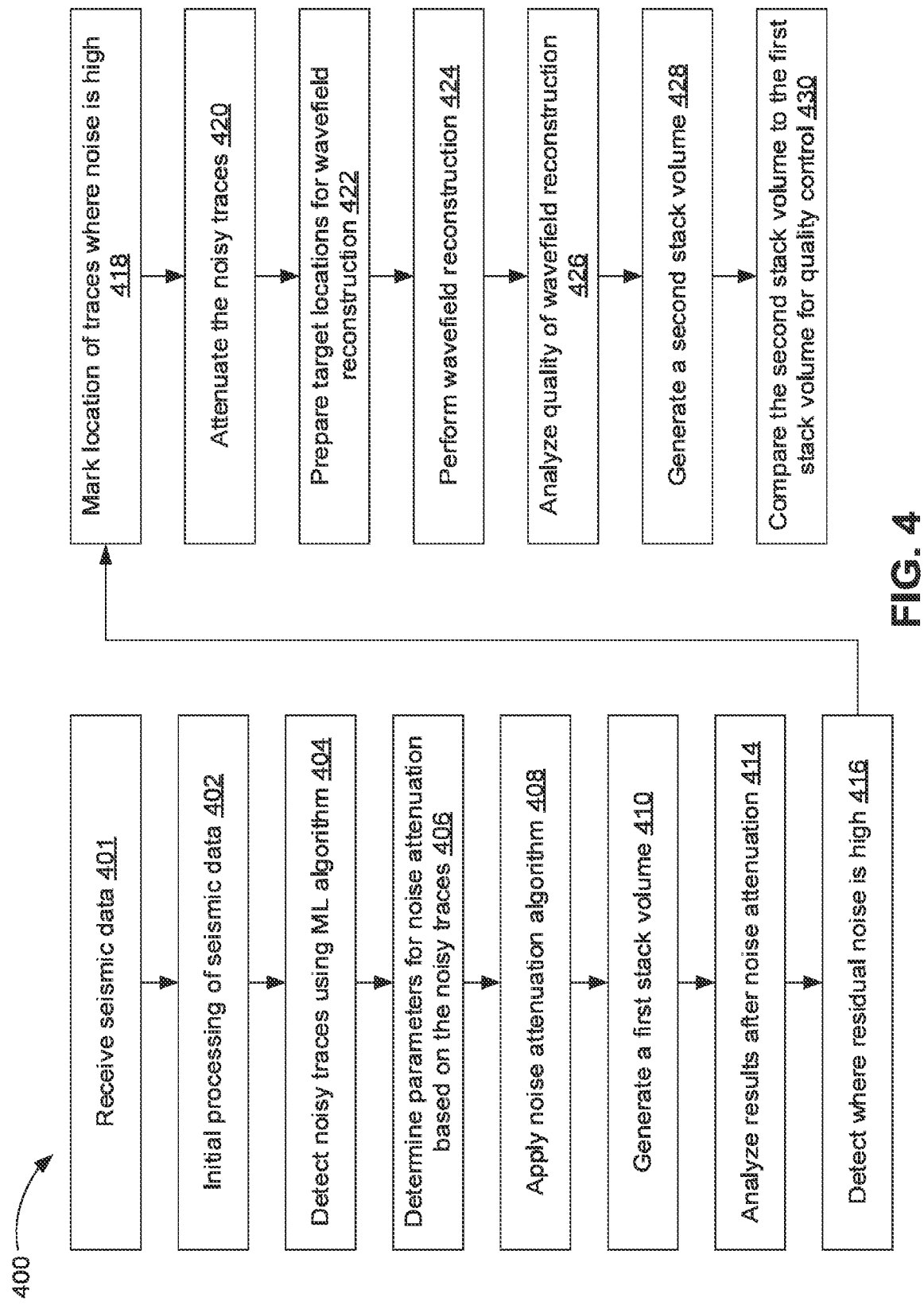
FIG. 4 illustrates a flowchart of a method for processing land-based seismic data, according to an embodiment.
Figure 8A:
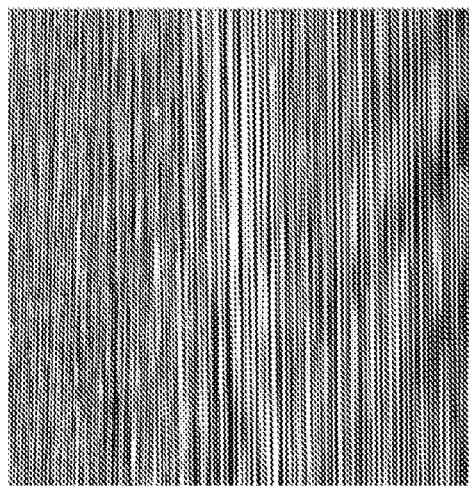
FIG. 8A illustrates a raw shot gather, according to an embodiment.

FIG. 4 illustrates a flowchart of a method 400 for processing marine seismic data, according to an embodiment. The method 400 may include receiving seismic data, as at 401, and applying an initial processing flow for marine data, e.g., to assign navigation geometry, trace and shot edits, receiver motion correction, designature and debubble, etc., as at 402. The raw shot gather, received as part of the initial seismic data, is shown in FIG. 8A.

The method 400 further includes detecting noisy traces using a machine learning (ML) algorithm, as at 404. Detecting at 404 may include training the ML algorithm using a training dataset extracted from the current dataset or previous datasets. The ML algorithm may be trained, in particular, to generate a map ("raw_map") that shows the location of noisy traces and different attributes to illustrate the type and level of noise.

Figure 8B:
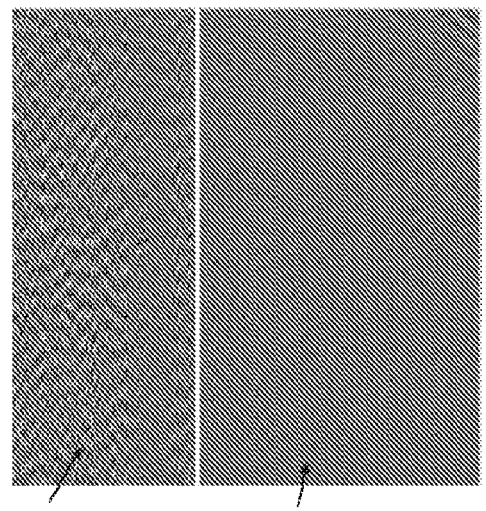
FIG. 8B illustrates the shot gather after a noise-mitigation algorithm is applied thereto.

The method 400 may also include using a ML algorithm, detecting a frequency content of the noisy traces and determining the parameters of a noise attenuation algorithm, such as the singular value decomposition (SVD) algorithm, in terms of maximum frequency of the high amplitude noise that will be attenuated, as at 406. The method 400 may further include probing the parameters to determining that low frequency, high amplitude noise is removed and the low frequency signal is not affected. This may be repeated for each line and may be performed by an ML algorithm. The method 400 may then include applying the noise attenuation algorithm for the lines with parameters derived for each line as described above, as at 408. These traces may be mitigated or otherwise removed, as shown in FIG. 8B. For example, as shown, 800 indicates noisy traces after SVD, while 802 indicates traces that are kept for interpolation.

Figure 10A:
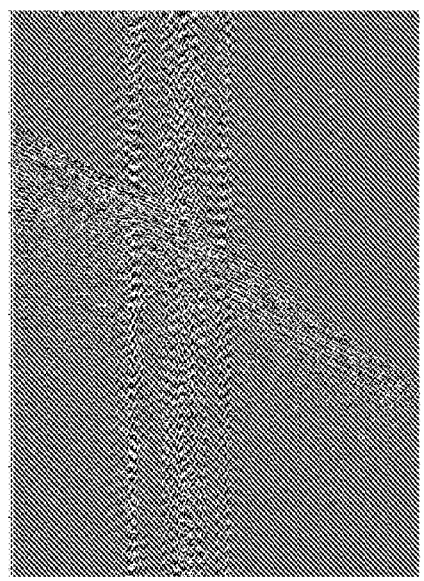
FIG. 10A illustrates a marine shot gather after a noise-mitigation algorithm is applied thereto.
Figure 10B:
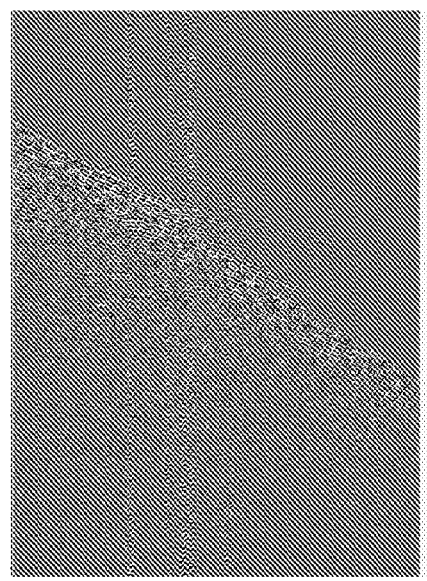
FIG. 10B illustrates the marine shot gather after the noise-mitigation algorithm is applied thereto and after the noisy traces are filtered, according to an embodiment.
Figure 9A:
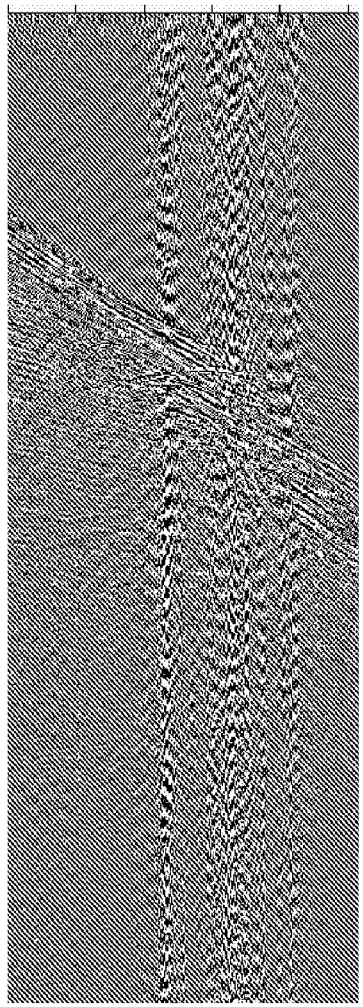
FIG. 9A illustrates a marine shot gather after a noise-mitigation algorithm is applied thereto.
Figure 9B:
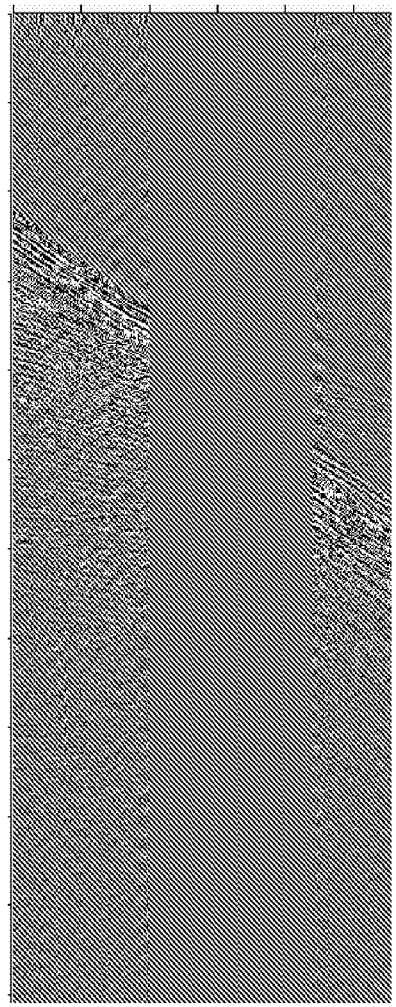
FIG. 9B illustrates the marine shot gather after the noise-mitigation algorithm is applied thereto and after the noisy traces are muted, according to an embodiment.

The method 400 may then include generating a stack volume ("raw stack volume"), as at 410, and outputting a series of inline, crossline and time slices for quality control. Next, the method 400 may include analyzing the results after noise attenuation (e.g., using SVD), as at 414, and detecting, e.g., using an ML algorithm, the traces where residual noise is high, as at 416. The method 400 may also include marking on the "noise map after SVD" the location of those traces, as at 418. The method 400 may then include attenuating the noisy traces, as at 420. To attenuate the identified noisy traces, the method 400 may include muting the noisy traces, e.g., scaling the noisy traces by zero, and keeping the rest of the traces (FIGS. 9A and 9B). Alternatively, the method 400 may include applying a low-cut filter to remove the low frequency noise (FIGS. 10A, 10B). In both examples, the header information is preserved. This may be repeated for each line inside the block.

The method 400 may then include preparing a dataset that contains the target output locations for the wavefield reconstruction process for the entire block, as at 422. Sampling parameters after wavefield reconstruction may be defined based on avoiding aliasing the maximum frequency.

The method 400 may then include performing wavefield reconstruction based on compressive sensing to interpolate the whole block dataset to the desired output locations, as at 424. Matching Pursuit Fourier Interpolation (MPFI), Time Domain Reflectometry Imaging (TDRI), and compressive sensing based on rank minimization are examples of methods that can be applied for wavefield reconstruction (interpolation). If data was acquired with simultaneous shooting, shot separation can be included in wavefield reconstruction.

The method 400 may then include, using a machine learning algorithm, analyzing the quality of reconstructed data in terms of frequency content and event continuity at the locations marked on the "noise map after SVD", as at 426.

At 428, the method 400 may then include generating a stack volume ("stack volume after wavefield reconstruction") and outputting a series of inline, crossline and time slices for quality control (QC) at the same locations as in 410. The method 400 may then include comparing the results with the results from block 410, as at 430.

If QC results demonstrate that wavefield reconstruction was successful, the foregoing actions are repeated for each block. Otherwise, the method 400 includes revising the parameters used in preliminary noise attenuation and wavefield reconstruction and repeating the foregoing actions for the same block. Further processing may then be applied for towed streamer data using new interpolated datasets. Based on the wavefield reconstruction, an image of the subterranean domain through which the seismic waves propagated may be generated and, e.g., visualized to a user. This image may represent a benefit to the user over conventional images, as the image may be prepared using the method 400, which efficiently reduces the noise in the wavefield and thus the image. Based on such enhanced imaging, the structure of the subterranean volume may be more accurately and/or efficiently determined, which may, for example, assist in hydrocarbon exploration.

Figure 5:
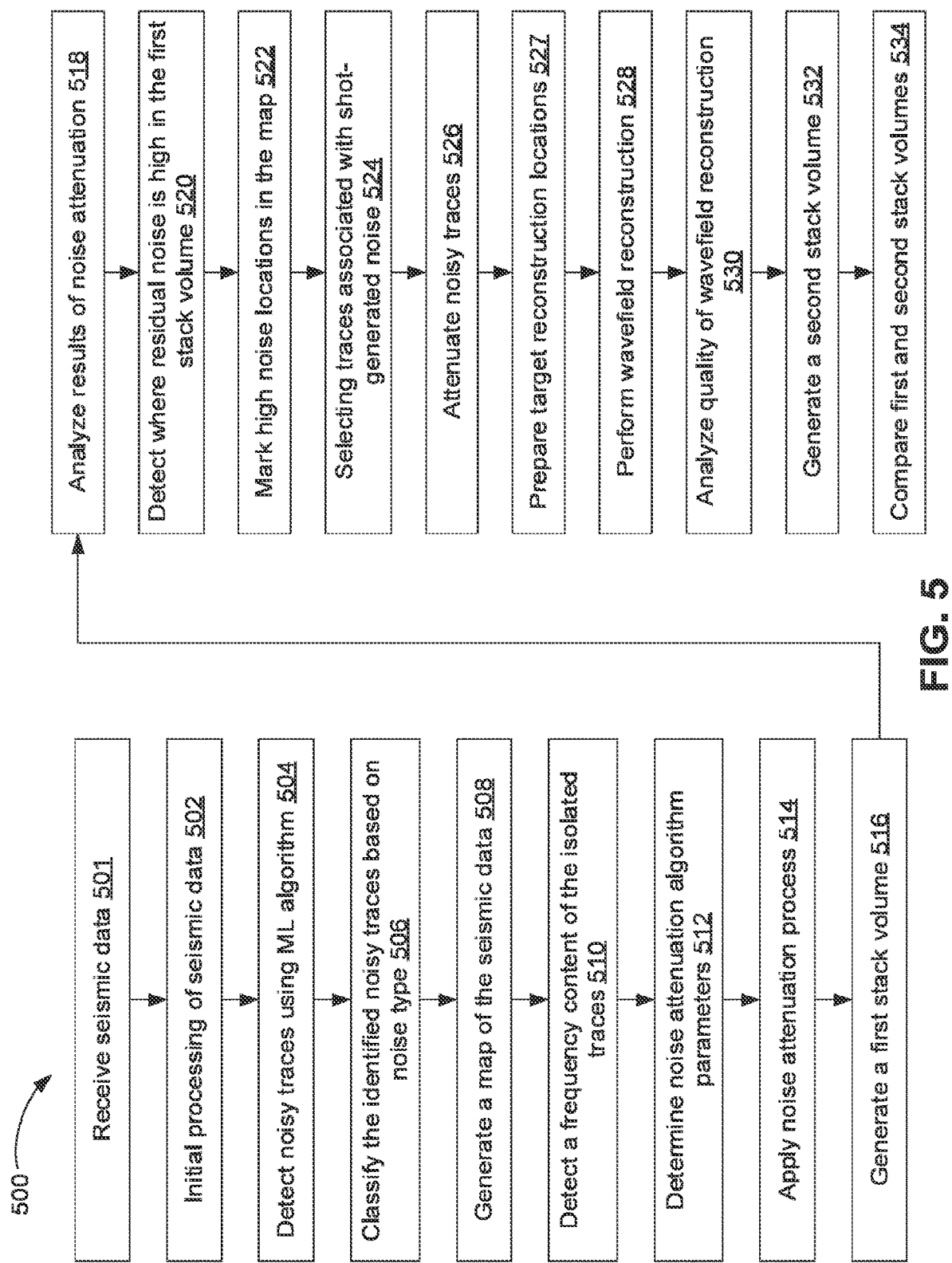
FIG. 5 illustrates a flowchart of a method for processing marine seismic data, according to an embodiment.
Figure 6:
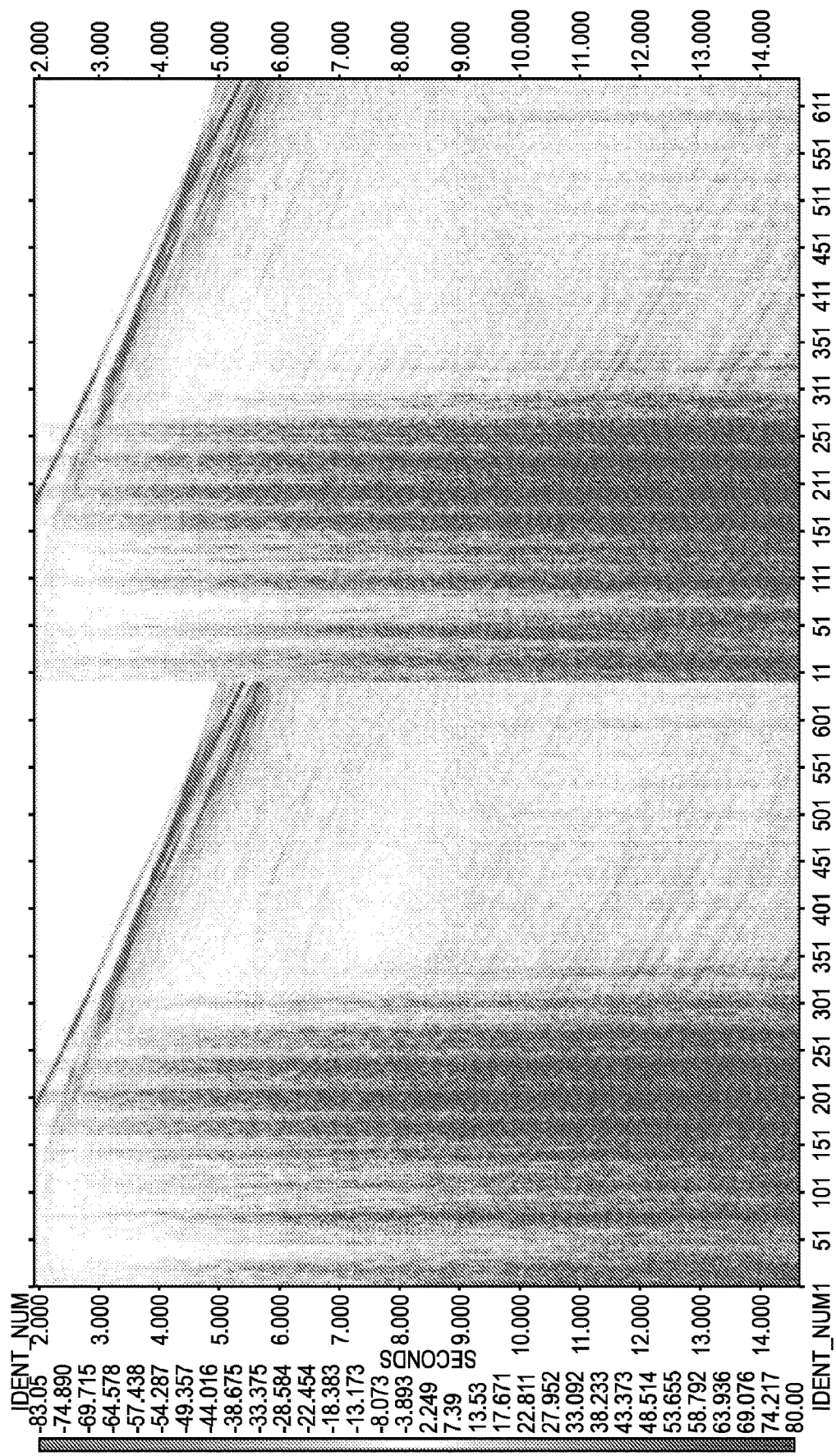
FIG. 6 illustrates an example of marine noise affecting part of a shot record, according to an embodiment.
Figure 7:
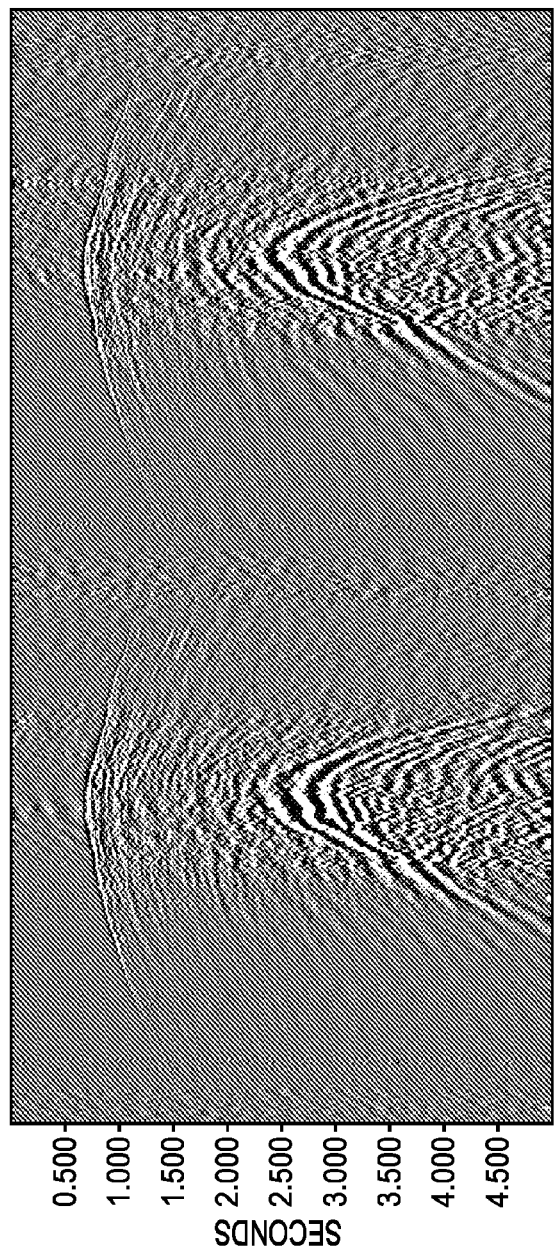
FIG. 7 illustrates an example of shot-generated noise, according to an embodiment.

FIG. 5 illustrates a flowchart of a method 500 for processing land-based seismic data, according to an embodiment. The method 500 includes receiving seismic data (shot gather), as at 501. The method 500 also includes applying an initial processing flow for land data to perform vibroseis correlation, trace edits, geometry merge, refraction static correction (derivation and application), as at 502. The method 500 also includes detecting noisy traces using a machine learning (ML) algorithm, e.g., based on a training dataset extracted from the current dataset or previous datasets, as at 504.

The identified noisy traces may be classified, as at 506, into classes. For example, the noisy traces can be classified as containing noise associated with the shot (e.g., groundroll for land surveys, Scholte waves for ocean bottom seismic surveys). Further, the noisy traces can be classified as containing isolated noise not related to the shot (e.g., power line, vehicle noise, wind noise, etc).

The method 500 may then include generating one or more maps representing the seismic data, as at 508. For example, the method 500 may include generating two such maps, e.g., a "shot_noise_map" that shows the location of shot generated noise, and a "isolated noise map" that show locations of other type of noise (isolated noise).

The method 500 may then proceed to using a ML algorithm, detecting the frequency content of the isolated noise traces, as at 510, and determining the parameters of the noise attenuation algorithm that could be used to attenuate the noise that can be easily discriminated based on frequency, amplitude, or other attribute, as at 512.

The method 500 may then include applying a noise attenuation process, such as Adaptive Anomaly Attenuation (AAA) or another algorithm, for one, some, or all lines with parameters derived for each line as described above, as at 514.

The method 500 may then include generating a stack volume ("raw stack volume") and outputting a series of inline, crossline and time slices for QC, as at 516. Next, the method 500 may include analyzing the results after noise mitigation, as at 518, and detecting, as at 520, using an ML algorithm, the traces where residual noise is high. The method 500 may then include marking on the "high noise map after AAA" the location of those traces, as at 522.

Next, the method 500 may include selecting traces associated with the shot-generated noise in a separate file ('shot generated noise file"), while keeping the header information, as at 524. These partial shots may be processed separately to extract information about Vs (shear wave velocity) in the near surface based on analysis of different modes of surface waves and inversion of the surface waves.

Figure 11A:
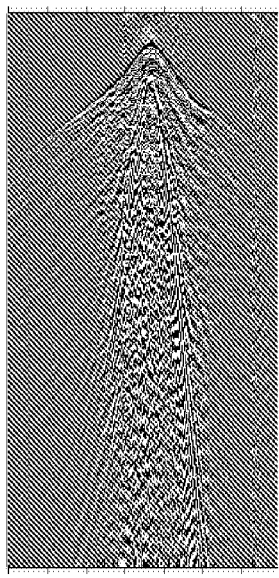
FIGS. 11A, 11B, and 11C illustrate the initial shot gather with noise muted.
Figure 11B:
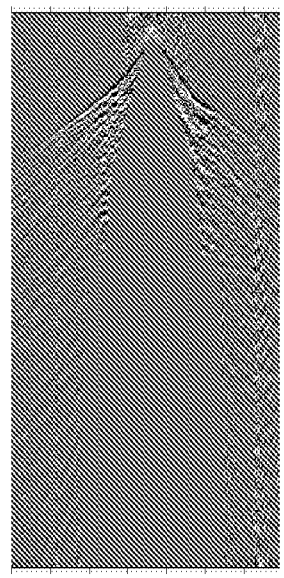
Figure 11C:
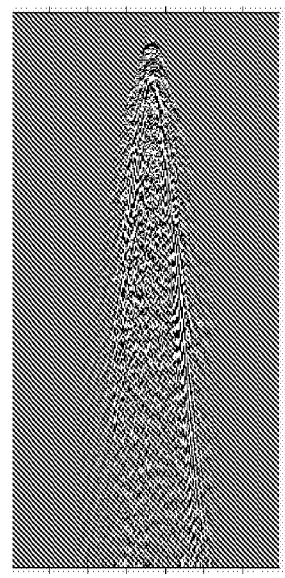
Figure 11D:
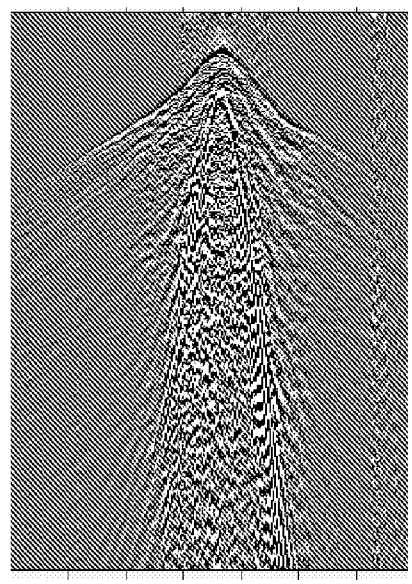
FIGS. 11D and 11E illustrate the initial shot gather with noise filtered and muted.
Figure 11E:
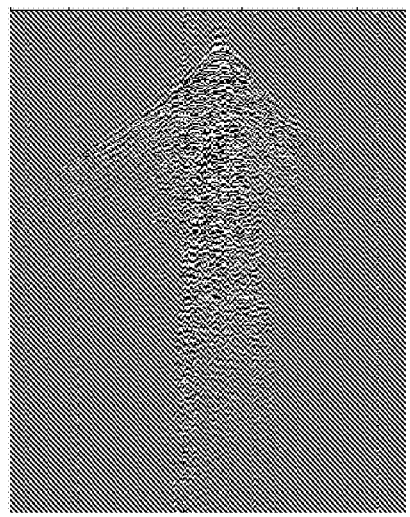

The method 500 may then remove noise generated by the traces identified as "high noise after AAA" and traces associated with the shot generated noise, as at 526. For example, the method 500 may include scaling the noisy traces by zero, and keeping the rest of the traces (FIGS. 11A-C). Alternatively or additionally, the method 500 may include applying a low-cut filter to remove the low frequency noise (FIGS. 11D and 11E). In both cases all the header information is preserved. This is applied for the shots inside the block. Afterwards, the shots with noisy traces scaled by "0" or noisy trace filtered, will be input in wavefield reconstruction algorithm.

Next, the method 500 may include preparing a dataset that contains the target output/reconstruction locations, for the entire block, for the wavefield reconstruction process, as at 527. The number of output traces per shot after wavefield reconstruction may be defined based on the requirements to preserve a defined maximum frequency that is non-aliased.

The method 500 may then include performing wavefield reconstruction based on compressive sensing to interpolate the whole block dataset to the desired output locations, as at 528. MPFI, TDRI, compressive sensing based on rank minimization, are type of processes that can be applied for wavefield reconstruction (interpolation).

The method 500 may then include, using a ML algorithm, analyzing the quality of reconstructed data in terms of frequency content and event continuity at the locations marked on the "high noise map after AAA" and "shot generated noise map", as at 530.

The method 500 may then include generating a stack volume ("stack volume after wavefield reconstruction"), as at 532. The method 500 may also include outputting a series of inline, crossline and time slices for QC at the same locations, and comparing the results with the results from block 516, as at 534.

If QC (comparison at 534) results demonstrate that wavefield reconstruction was successful, the method 500 may repeat the prior blocks 502-534 for each individual block. Otherwise, if the results are not acceptable, the method 500 may include revising the parameters used in preliminary noise attenuation and wavefield reconstruction and rerun the flow, beginning again at 502. Once the blocks are successfully noise-attenuated, the method 500 may then include continuing the processing flow for land data using new interpolated datasets.

Figure 12:
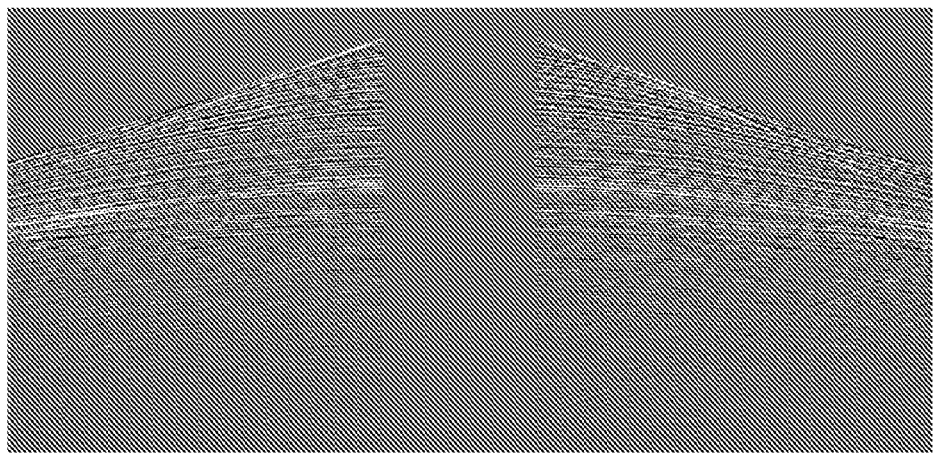
FIG. 12 illustrates an example of a shot gather where the traces affected by the shot generated noise are muted.
Figure 13:
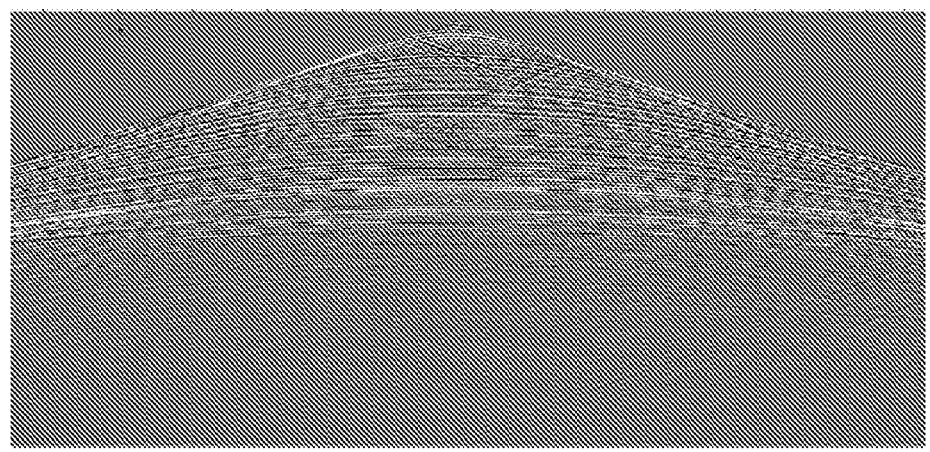
FIG. 13 illustrates the shot gather of FIG. 12, after wavefield reconstruction.

In FIG. 12, there is shown an example of synthetic data where the noisy traces associated to the shot point were removed, and in FIG. 13 there is shown the reconstruction of the missing traces. The entire data set may be used as input in the reconstruction process.

It will be appreciated that wavefield reconstruction is performed earlier in the processing sequence and it will be beneficial for demultiple, velocity model building and imaging. Further, embodiments of the method 500 may address the noise problem and wavefield reconstruction (interpolation) in one step, thereby reducing processing time. Further, the wavefield reconstruction may allow for generation of an enhanced image of the subterranean domain through which the seismic waves propagate. This image may represent a benefit to the user over conventional images, as the image may be prepared using the method 500, which efficiently reduces the noise in the wavefield and thus the image. Based on such enhanced imaging, the structure of the subterranean volume may be more accurately and/or efficiently determined, which may, for example, assist in hydrocarbon exploration.

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 14:
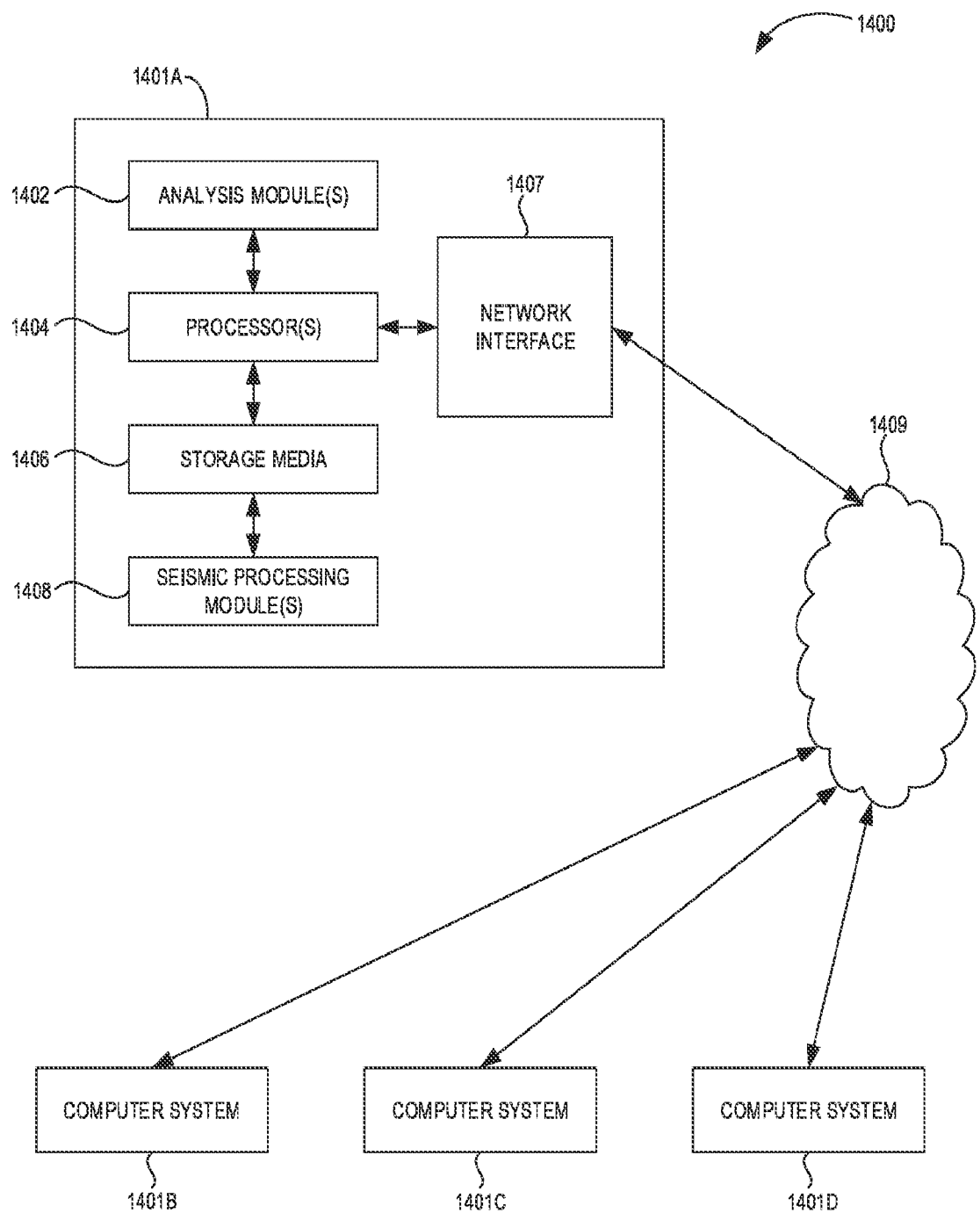
FIG. 14 illustrates a schematic view of a computing system, according to an embodiment.

In some embodiments, any of the methods of the present disclosure may be executed by a computing system. FIG. 14 illustrates an example of such a computing system 1400, in accordance with some embodiments. The computing system 1400 may include a computer or computer system 1401A, which may be an individual computer system 1401A or an arrangement of distributed computer systems. The computer system 1401A includes one or more analysis module(s) 1402 configured to perform various tasks according to some embodiments, such as one or more methods disclosed herein. To perform these various tasks, the analysis module 1402 executes independently, or in coordination with, one or more processors 1404, which is (or are) connected to one or more storage media 1406. The processor(s) 1404 is (or are) also connected to a network interface 1407 to allow the computer system 1401A to communicate over a data network 1409 with one or more additional computer systems and/or computing systems, such as 1401B, 1401C, and/or 1401D (note that computer systems 1401B, 1401C and/or 1401D may or may not share the same architecture as computer system 1401A, and may be located in different physical locations, e.g., computer systems 1401A and 1401B may be located in a processing facility, while in communication with one or more computer systems such as 1401C and/or 1401D that are located in one or more data centers, and/or located in varying countries on different continents).

A processor can include a microprocessor, microcontroller, processor module or subsystem, programmable integrated circuit, programmable gate array, or another control or computing device.

The storage media 1406 can be implemented as one or more computer-readable or machine-readable storage media. Note that while in the example embodiment of FIG. 14 storage media 1406 is depicted as within computer system 1401A, in some embodiments, storage media 1406 may be distributed within and/or across multiple internal and/or external enclosures of computing system 1401A and/or additional computing systems. Storage media 1406 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1400 contains one or more seismic processing module(s) 1408. In the example of computing system 1400, computer system 1401A includes the seismic processing module 1408. In some embodiments, a single seismic processing module may be used to perform some or all aspects of one or more embodiments of the methods. In alternate embodiments, a plurality of seismic processing modules may be used to perform some or all aspects of methods.

It should be appreciated that computing system 1400 is only one example of a computing system, and that computing system 1400 may have more or fewer components than shown, may combine additional components not depicted in the example embodiment of FIG. 14, and/or computing system 1400 may have a different configuration or arrangement of the components depicted in FIG. 14. The various components shown in FIG. 14 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1400, FIG. 14), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method for processing seismic data, comprising:
receiving seismic data comprising seismic traces collected from a land-based or marine seismic array;
applying a noise mitigation process to the seismic data to generate a first stack volume;
identifying, using a machine learning algorithm, one or more traces of the seismic traces as having a relatively high residual noise, after applying the noise mitigation process, in comparison to other traces of the seismic traces;
mitigating noise in the one or more identified traces;
performing a wavefield reconstruction to generate a second stack volume after mitigating the noise in the one or more identified traces, to interpolate a portion of the wavefield reconstruction corresponding to where the one or more identified traces were located and mitigated;
comparing the first stack volume and the second stack volume to obtain a comparison, and based on the comparison, selectively:
changing one or more parameters of the noise mitigation process and repeating the applying, the identifying, the mitigating, the performing, and the comparing; or
continuing with the second stack volume generated by the wavefield reconstruction; and
generating an image of a subterranean domain based on the seismic data after mitigating the noise and performing the wavefield reconstruction.

2. The method of claim 1, further comprising:
identifying the one or more traces prior to applying the noise mitigation process; and
determining values for parameters of the noise mitigation process based on one or more characteristics of the one or more traces.

3. The method of claim 1, wherein mitigating the noise in the one or more identified traces comprises at least one of scaling the one or more identified traces by zero, or applying a low-cut filter to remove low frequency noise in the one or more identified traces.

4. The method of claim 1, wherein identifying comprises mapping the seismic traces to illustrate a location of the one or more identified traces.

5. The method of claim 4, further comprising:
comparing the second stack volume to the first stack volume; and
determining that the wavefield reconstruction was successful based on frequency content and event continuity at least in the location of the one or more identified traces.

6. The method of claim 1, wherein the noise mitigation process comprises singular value decomposition or adaptive anomaly attenuation.

7. The method of claim 1, further comprising:
determining the one or more parameters for the noise mitigation process using the machine learning algorithm,
determining that the wavefield reconstruction was unsuccessful based on the comparison of the first stack volume and the second stack volume; and
in response to determining that the wavefield reconstruction was unsuccessful, changing the one or more parameters of the noise mitigation process.

8. A non-transitory, computer-readable medium storing instructions that, when executed by one or more processors of a computing system, cause the computing system to perform operations, the operations comprising:
receiving seismic data comprising seismic traces collected from a land-based or marine seismic array;
applying a noise mitigation process to the seismic data to generate a first stack volume;
identifying, using a machine learning algorithm, one or more traces of the seismic traces as having a relatively high residual noise, after applying the noise mitigation process, in comparison to other traces of the seismic traces;
mitigating noise in the one or more identified traces;
performing a wavefield reconstruction to generate a second stack volume after mitigating the noise in the one or more identified traces, to interpolate a portion of the wavefield reconstruction corresponding to where the one or more identified traces were located and mitigated;
comparing the first stack volume and the second stack volume to obtain a comparison, and based on the comparison, selectively:
changing one or more parameters of the noise mitigation process and repeating the applying, the identifying, the mitigating, the performing, and the comparing; or
continuing with the second stack volume generated by the wavefield reconstruction; and
generating an image of a subterranean domain based on the seismic data after mitigating the noise and performing the wavefield reconstruction.

9. The non-transitory, computer-readable medium of claim 8, wherein the operations further comprise:
identifying the one or more traces prior to applying the noise mitigation process; and
determining values for parameters of the noise mitigation process based on one or more characteristics of the one or more traces.

10. The non-transitory, computer-readable medium of claim 8, wherein mitigating the noise in the one or more identified traces comprises at least one of:
scaling the one or more identified traces by zero; or
applying a low-cut filter to remove low frequency noise in the one or more identified traces.

11. The non-transitory, computer-readable medium of claim 8, wherein identifying comprises mapping the seismic traces to illustrate a location of the one or more identified traces.

12. The non-transitory, computer-readable medium of claim 11, wherein the operations further comprise:
comparing the second stack volume to the first stack volume; and
determining that the wavefield reconstruction was successful based on frequency content and event continuity at least in the location of the one or more identified traces.

13. The non-transitory, computer-readable medium of claim 8, wherein the noise mitigation process comprises singular value decomposition or adaptive anomaly attenuation.

14. The non-transitory, computer-readable medium of claim 8, wherein the operations further comprise:
determining the one or more parameters for the noise mitigation process using the machine learning algorithm,
determining that the wavefield reconstruction was unsuccessful based on the comparison of the first stack volume and the second stack volume; and
in response to determining that the wavefield reconstruction was unsuccessful, changing the one or more parameters of the noise mitigation process.

15. A computing system, comprising:
one or more processors; and
a memory system comprising one or more non-transitory, computer-readable media storing instructions that, when executed by at least one of the one or more processors, cause the computing system to perform operations, the operations comprising:
receiving seismic data comprising seismic traces collected from a land-based or marine seismic array;
applying a noise mitigation process to the seismic data to generate a first stack volume;
identifying, using a machine learning algorithm, one or more traces of the seismic traces as having a relatively high residual noise, after applying the noise mitigation process, in comparison to other traces of the seismic traces;
mitigating noise in the one or more identified traces;
performing a wavefield reconstruction to generate a second stack volume after mitigating the noise in the one or more identified traces, to interpolate a portion of the wavefield reconstruction corresponding to where the one or more identified traces were located and mitigated;
comparing the first stack volume and the second stack volume to obtain a comparison, and based on the comparison, selectively:
changing one or more parameters of the noise mitigation process and repeating the applying, the identifying, the mitigating, the performing, and the comparing; or
continuing with the second stack volume generated by the wavefield reconstruction; and
generating an image of a subterranean domain based on the seismic data after mitigating noise and performing the wavefield reconstruction.

16. The computing system of claim 15, wherein the operations further comprise:
   identifying the one or more traces prior to applying the noise mitigation process; and
   determining values for parameters of the noise mitigation process based on one or more characteristics of the one or more traces.

17. The computing system of claim 15, wherein mitigating the noise in the one or more identified traces comprises at least one of:
   scaling the one or more identified traces by zero; or
   applying a low-cut filter to remove low frequency noise in the one or more identified traces.

18. The computing system of claim 17, wherein the operations further comprise:
   comparing the second stack volume to the first stack volume; and
   determining that the wavefield reconstruction was successful based on frequency content and event continuity at least in a location of the one or more identified traces.

19. The computing system of claim 15, wherein the operations further comprise:
   determining the one or more parameters for the noise mitigation process using the machine learning algorithm,
   determining that the wavefield reconstruction was unsuccessful based on the comparison of the first stack volume and the second stack volume; and
   in response to determining that the wavefield reconstruction was unsuccessful, changing the one or more parameters of the noise mitigation process.

20. The computing system of claim 19, wherein determining that the wavefield reconstruction was unsuccessful based on the comparison of the first stack volume and the second stack volume comprises:
   comparing a plurality of first inline slices with a plurality of second inline slices;
   comparing a plurality of first crossline slices with a plurality of second crossline slices; and
   comparing a plurality of first time slices with a plurality of second time slices.

* * * * *